United States Patent [19]

Chen

[11] Patent Number: 5,167,082
[45] Date of Patent: Dec. 1, 1992

[54] DYNAMOELECTRIC SHOES

[76] Inventor: Shi-Hiu Chen, 5F, No. 564, Sec. 1, Chung-Te Rd., Taichung, Taiwan

[21] Appl. No.: 755,221

[22] Filed: Sep. 5, 1991

[51] Int. Cl.$^5$ .............................................. A43B 7/02
[52] U.S. Cl. ........................................ 36/2.6; 36/137; 219/211
[58] Field of Search ........................ 36/137, 139, 2.6; 219/211

[56] References Cited

U.S. PATENT DOCUMENTS

| | | | |
|---|---|---|---|
| 1,506,282 | 8/1924 | Barbieri | 219/211 X |
| 4,507,877 | 4/1985 | Vaccari et al. | 36/2.6 |
| 4,674,199 | 6/1987 | Lakic | 36/2.6 |
| 4,697,359 | 10/1987 | Balbinot | 36/2.6 |
| 4,780,968 | 11/1988 | Bragagnolo | 36/2.6 |
| 4,782,602 | 11/1988 | Lakic | 36/2.6 |
| 4,837,494 | 6/1989 | Maier . | |
| 4,845,338 | 7/1989 | Lakic . | |
| 4,941,271 | 7/1990 | Lakic | 36/2.6 |

Primary Examiner—Paul T. Sewell
Assistant Examiner—Ted Kavanaugh
Attorney, Agent, or Firm—Sughrue, Mion, Zinn, Macpeak and Seas

[57] ABSTRACT

A dynamoelectric shoe has a shoe sole that confines a watertight compartment. A pressure-operated electric generator is provided inside the watertight compartment adjacent to a heel portion of the shoe sole. The electric generator produces a voltage signal when pressure is repeatedly applied on the shoe sole during use. An electrical socket is mounted on the shoe sole and a rechargeable battery cell is wired to the electrical socket and is charged by the voltage signal from the electric generator means. The dynamoelectric shoe can be used to operate a portable wireless telephone, a portable radio, a light device to aid the user at night, or a heating device to warm the user's foot during winter.

4 Claims, 4 Drawing Sheets

DYNAMOELECTRIC SHOES

BACKGROUND OF THE INVENTION

1. Field of the Invention

The invention relates to a shoe construction, more particularly to a dynamoelectric shoe construction which has a pressure-operated electric generator means for producing electricity that can be used to operate a portable wireless telephone, a portable radio, a light device to aid the user at night, or a heating device to warm the user's foot during winter.

2. Description of the Related Art

Present shoe manufacturing and design trends favor lightness and user comfort. One example of such a shoe construction is the relatively new and popular "air sole" shoes.

SUMMARY OF THE INVENTION

The objective of the present invention is to provide a dynamoelectric shoe which can convert the mechanical force exerted by a user during walking into an electrical power source.

Specifically, the objective of the present invention is to provide a dynamoelectric shoe which has a pressure-operated electric generator means for producing electricity that can be used to operate a portable wireless telephone, a portable radio, a light device to aid the user at night, or a heating device to warm the user's foot during winter. Accordingly, the preferred embodiment of a dynamoelectric shoe of the present invention comprises a shoe sole confining a watertight compartment, a pressure-operated electric generator means provided inside the watertight compartment adjacent to a heel portion of the shoe sole, the electric generator means producing a voltage signal when pressure is repeatedly applied on the shoe sole during use, and a power outlet means including an electrical socket mounted on the shoe sole and a rechargeable battery cell means wired to the electrical socket and to the electric generator means. The rechargeable battery cell means is charged by the voltage signal from the electric generator means and includes a rechargeable battery cell connected to the electrical socket, a battery charger circuit means receiving the voltage signal from the electric generator means so as to charge the rechargeable battery cell, a charging control means including means for deactivating the battery charger circuit means so as to stop charging of the rechargeable battery cell when the voltage across the battery cell exceeds a predetermined limit, and a supplementary current supplying circuit means for providing additional current to the electrical socket when a plug is inserted into the electrical socket.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
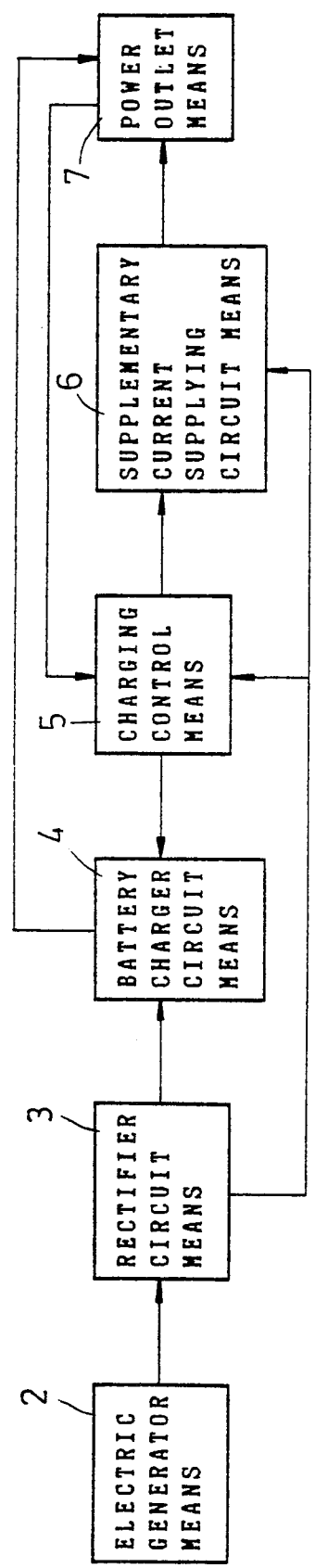
FIG. 1 is a schematic block diagram illustrating the components provided inside a watertight compartment confined by the shoe sole of a dynamoelectric shoe according to the present invention.
Figure 2:
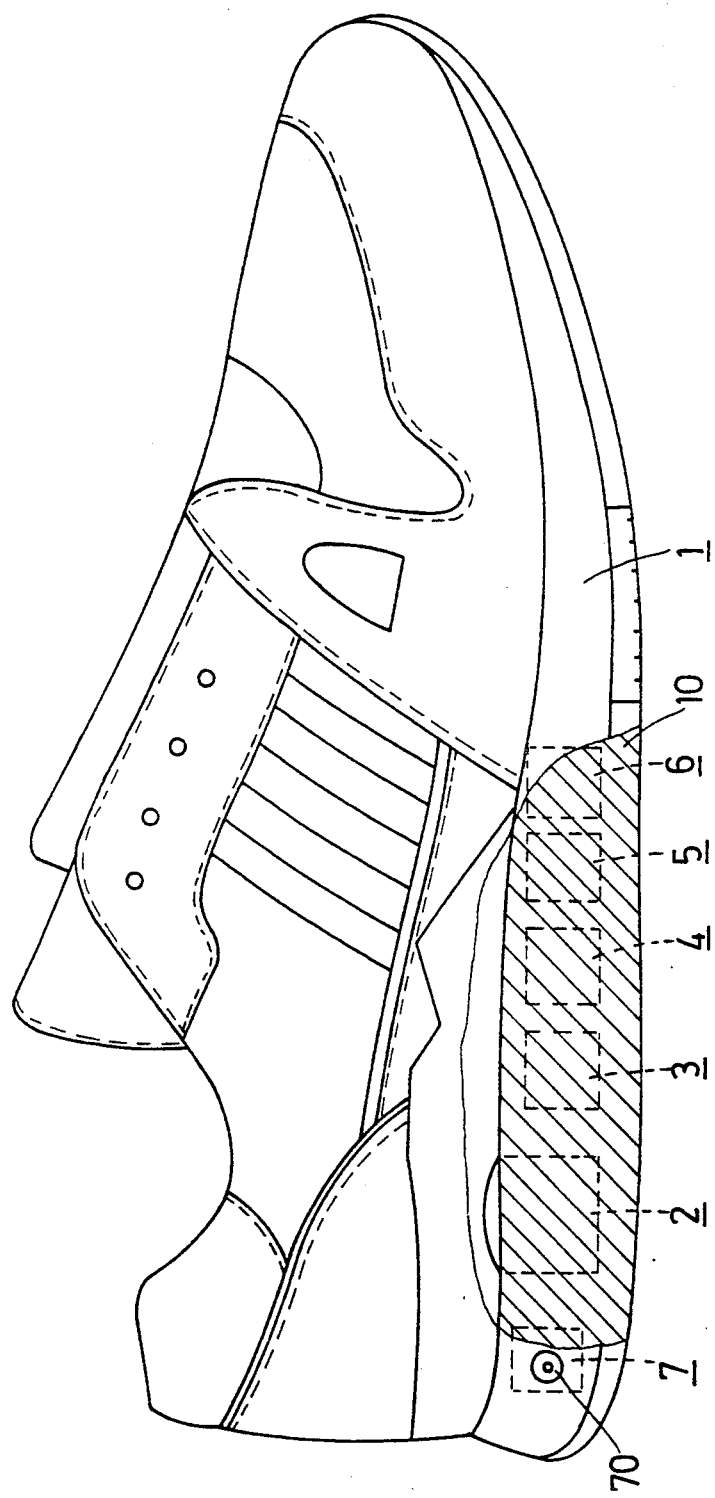
FIG. 2 is a schematic side view of the preferred embodiment of a dynamoelectric shoe according to the present invention.

Referring to FIGS. 1 and 2, the preferred embodiment of a dynamoelectric shoe according to the present invention is shown to have a shoe sole (1) which confines a watertight compartment (10). The following components are provided inside the watertight compartment (10): a pressure-operated electric generator means (2) disposed adjacent to a heel portion of the watertight compartment (10); a rectifier circuit means (3) wired to the electric generator means (2); a battery charger circuit means (4); a charging control means (5); a supplementary current supplying circuit means (6); and a power outlet means (7) including an electrical socket (70) mounted on the shoe sole (1).

When the preferred embodiment is in use, the heel of the user repeatedly applies pressure on the pressure-operated electric generator means (2), thereby producing an ac voltage signal which is rectified by the rectifier circuit means (3). The rectified voltage signal is used to charge rechargeable battery cells, (B1) and (B2), (Refer to FIG. 4), which can provide electric power to a portable wireless telephone, a portable radio, a light device to aid the user at night, or to a heating device to warm the user's foot during winter.

Figure 3:
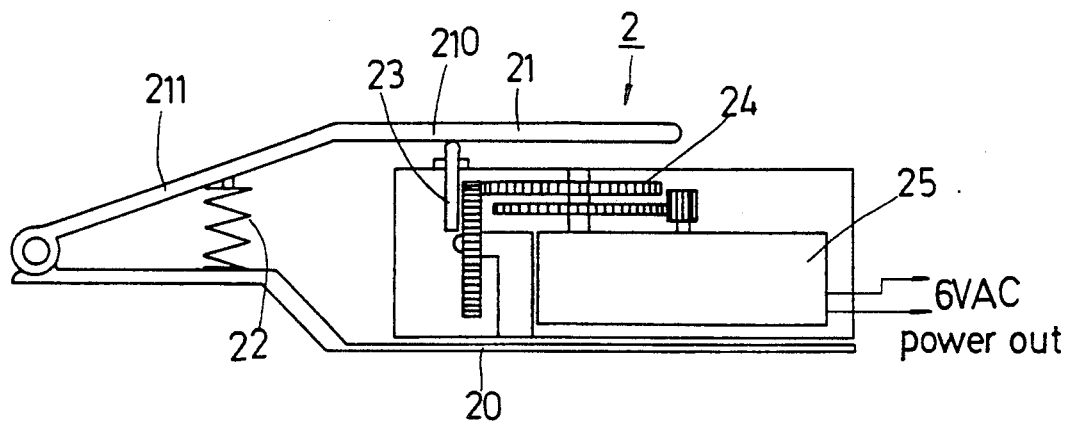
FIG. 3 illustrates a pressure-operated electric generator means of the preferred embodiment of a dynamoelectric shoe according to the present invention.

FIG. 3 is an illustration of the pressure-operated electric generator means (2) of the preferred embodiment. The electric generator means (2) includes a press plate (21) having a horizontal press portion (210) and an inclined portion (211) extending rearwardly from the press portion (210) and having one end pivoted on a base plate (20). A compression spring (22) is provided between the inclined portion (211) and the base plate (20) to bias the press plate (21) away from the base plate (20). A driving shaft (23) extends downward from the press portion (210). When pressure is applied on the press portion (210), the driving shaft (23) moves downward to rotatably actuate a speed increasing gear assembly (24). The gear assembly (24) rotates the rotor of an alternator means (25) to thereby produce a 6 VAC output.

Figure 3A:
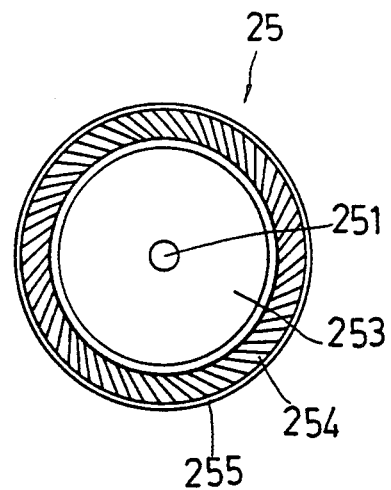
FIG. 3A is a top view of an alternator means of the pressure-operated electric generator means shown in FIG. 3.

FIG. 3A is a top view of the alternator means (25) shown in FIG. 3. The alternator means (25) has an axial shaft (251), a rotor (253) mounted axially around the shaft (251), a stator (254) provided around the rotor (253), and a casing (255) provided around the stator (254). The construction of the alternator means (25) is known in the art and will not be detailed further.

The construction of the pressure-operated electric generator means should not be limited to that shown in FIG. 3. A material which produces electricity when compressed, such as monazite, may be employed to supply the required voltage signal to the other circuit components.

Figure 4:
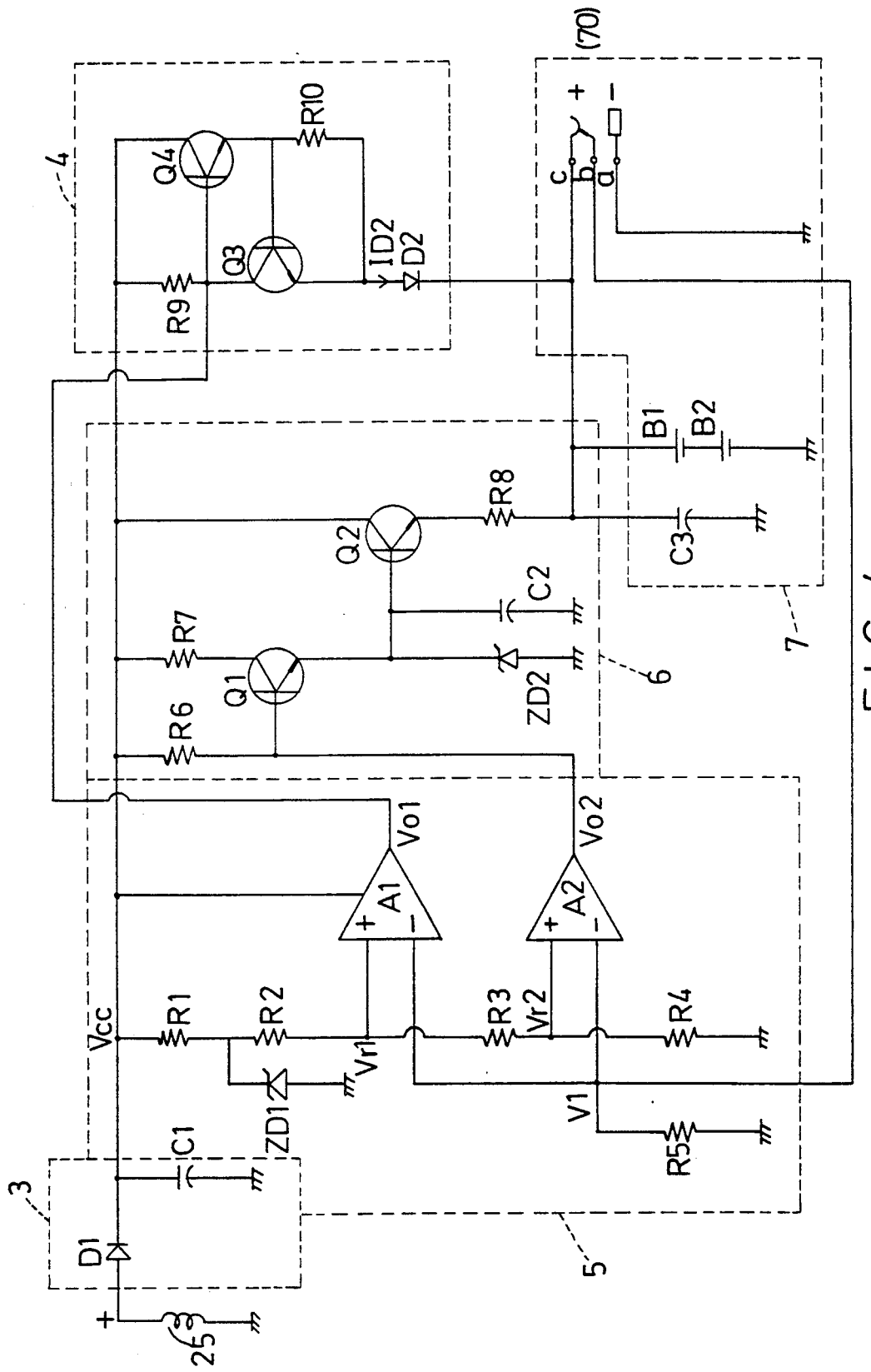
FIG. 4 is a schematic electrical circuit diagram corresponding to the schematic block diagram shown in FIG. 1.

Referring to the schematic electrical circuit diagram shown in FIG. 4, the ac voltage output of the alternator means (25) serves as input to the rectifier circuit means (3). The rectifier circuit means (3) is a half-wave rectifier circuit and includes a diode (D1) and a capacitor (C1) connected to the cathode of the diode (D1). A fairly stable dc voltage signal (Vcc) can be measured across the capacitor (C1).

The battery charger circuit means (4) is connected to the rectifier circuit means (3) and includes a pair of resistors, (R9) and (R10), and a pair of transistors, (Q3) and (Q4). The battery charger circuit means (4) acts as a constant current source which continuously charges a pair of rechargeable battery cells, (B1) and (B2), of the power outlet means (7) until the voltage (V1) across the battery cells, (B1) and (B2), exceeds a reference voltage (Vr1) of the charging control means (5) to thereby prevent damage to the battery cells, (B1) and (B2), due to overcharging.

The charging control means (5) includes four resistors (R1–R4) and a zener diode (ZD1) which are arranged so as to set a pair of reference voltages, (Vr1) and (Vr2). The charging control circuit means (5) further includes a first comparator (A1) having (Vr1) and (V1) as inputs thereto, and a second comparator (A2) having (Vr2) and (V1) as inputs thereto. When the battery voltage (V1) is greater than the reference voltage (Vr1), the voltage output (Vo1) of the first comparator (A1) $\approx 0$ volts. The output of the first comparator (A1) is connected to the base terminal of the transistor (Q4) of the battery charger circuit means (4). When the voltage output (Vo1) $\approx 0$ volts, the transistor (Q4) ceases to conduct, and the current (ID2) from the transistor (Q3) $\approx 0$ amperes. Charging of the battery cells, (B1) and (B2), is thus stopped.

The supplementary current supplying circuit means (6) includes resistors (R6–R8), transistors (Q1) and (Q2), a capacitor (C8) and a zener diode (ZD2).

Initially, when no plug is inserted into the electrical socket (70), the battery voltage (V1) is greater than the reference voltage (Vr2), and the voltage output (Vo2) of the second comparator (A2) $\approx 0$ volts. The output of the second comparator (A2) is connected to the base terminal of the transistor (Q1). The transistor (Q1) has an emitter terminal connected to the base terminal of a transistor (Q2). Thus, when the voltage output (Vo2) $\approx 0$ volts, the transistors, (Q1) and (Q2), cease to conduct [that is, no current flows through the transistor (Q2)]The transistor (Q1) also prevents overloading of the second comparator (A2).

When a plug is inserted into the electrical socket (70), the contact terminals, (b) and (c), of the electrical socket (70) are open-circuited, while the contact terminals, (b) and (a), are short-circuited. The (V1) inputs of the first and second comparators, (A1) and (A2), are grounded. Thus, (Vo1)=(Vcc)−(Vr9) $\approx 2.8$ volts, while (Vo2)=(Vcc)−(Vr6)$\approx 1.8$ volts. Electric power is supplied to a load connected to the electrical socket (70) via the battery cells, (B1) and (B2), and the transistor (Q2).

When the preferred embodiment is in a motionless state and no plug is inserted into the electrical socket (70), the battery cells, (B1) and (B2), discharge via the resistor (R9). The resistance of the resistor (R9) is relatively large so as to minimize its electrical power consumption.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A dynamoelectric shoe, comprising:
   a shoe sole confining a watertight compartment;
   a pressure-operated electric generator means provided inside said watertight compartment adjacent to a heel portion of said shoe sole, said electric generator means producing a voltage signal when pressure is repeatedly applied on said shoe sole during use; and
   a power outlet means including an electrical socket mounted on said shoe sole and a rechargeable battery cell means wired to said electrical socket and to said electric generator means, said rechargeable battery cell means being charged by said voltage signal from said electric generator means, wherein said rechargeable battery cell means comprises:
   a rechargeable battery cell connected to said electrical socket;
   a battery charger circuit means receiving said voltage signal from said electric generator means so as to charge said rechargeable battery cell,
   a charging control means including means for deactivating said battery charger circuit means so as to stop charging of said rechargeable battery cell when the voltage across said battery cell exceeds a predetermined limit; and
   a supplementary current supplying circuit means for providing additional current to said electrical socket when a plug is inserted into said electrical socket.

2. The dynamoelectric shoe as claimed in claim 1, wherein said electric generator means comprises:
   a base plate;
   a press plate having a horizontal press portion and an inclined portion extending rearwardly from said press portion, one end of said inclined portion being pivoted on said base plate;
   a compression spring provided between said inclined portion and said base plate to bias said press plate away from said base plate;
   a driving shaft extending downward from said press portion;
   a speed increasing gear assembly rotatably actuated by upward and downward movement of said driving shaft when pressure is repeatedly applied on said press portion during use; and
   an alternator means having a rotor rotatably driven by said gear assembly so as to produce said voltage signal.

3. The dynamoelectric shoe as claimed in claim 2, wherein said electric generator means further comprises a rectifier circuit means connected to said alternator means so as to rectify said voltage signal.

4. The dynamoelectric shoe as claimed in claim 1, wherein said charging control means further comprises:
   means for detecting if said plug is inserted into said electrical socket; and
   means for deactivating said supplementary current supplying circuit means when said plug is not inserted into said electrical socket.

* * * * *